(No Model.)
F. G. & J. R. BISBEE.
BRAKE FOR STATIONARY ENGINES.
No. 358,534. Patented Mar. 1, 1887.
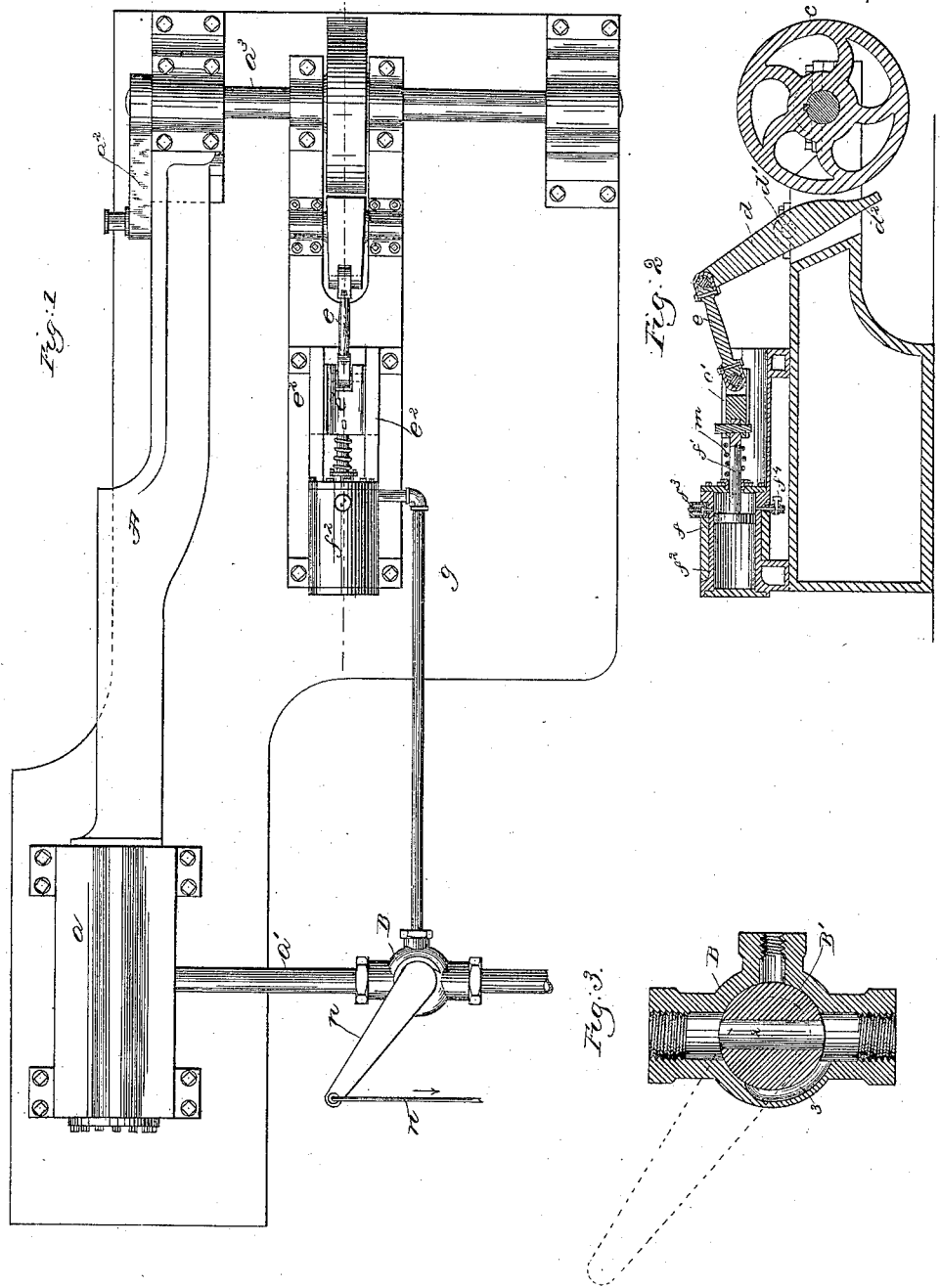

UNITED STATES PATENT OFFICE.

FREDERIC G. BISBEE AND JOHN R. BISBEE, OF CANTON, MASSACHUSETTS.

BRAKE FOR STATIONARY ENGINES.

SPECIFICATION forming part of Letters Patent No. 358,534, dated March 1, 1887.

Application filed May 8, 1886. Serial No. 201,594. (No model.)

*To all whom it may concern:*

Be it known that we, FREDERIC G. BISBEE and JOHN R. BISBEE, both of Canton, county of Norfolk, and State of Massachusetts, have invented an Improvement in Brakes for Stationary Engines, of which the following description, in connection with the accompanying drawings, is a specification, like letters on the drawings representing like parts.

This invention has for its object to provide an engine with a steam-actuated brake controlled as to its operation from any distant point, so that the engine may be stopped by a person in a distant part of the building, as in case of accident or for other cause, without the necessity of going to the engine-room or calling up the engineer.

To this end our invention consists in the constructions and combinations embraced by the claims appended to this specification.

Figure 1 shows in plan view the frame-work and main portion of a stationary engine of ordinary type, together with an auxiliary engine and supply-pipe constructed in accordance with this invention; Fig. 2, a longitudinal section of the auxiliary engine and the mechanism controlled by it for arresting the movements of the main engine, and Fig. 3 a vertical section of the valve for controlling the passage of steam to one or the other engine.

The main engine, composed of the frame-work A, steam-cylinder $a$, supply-pipe $a'$, crank $a^2$, and main shaft $a^3$, is and may be of any usual or suitable construction.

The wheel or pulley $c$, of any suitable construction, is secured to the main shaft $a^3$, preferably adjacent to the usual fly-wheel. (Not shown.)

A brake-shoe of suitable construction is arranged to be brought in contact with the wheel $c$ when desired to arrest the movement of the main engine, said brake-shoe in this instance consisting of a lever-like shoe, $d^2$, pivoted at $d'$, one arm, $d$, of the said shoe being connected by a pitman, $e$, with a cross-head, $e'$, moving in guides $e^2$, the said cross-head being attached to the rod $f'$ of the piston $f$, placed in a steam-cylinder, $f^2$, the said cylinder having a suitable safety-valve, $f^3$, and a blow-off valve, $f^4$.

Steam is supplied to the steam-cylinder $f^2$ of the auxiliary engine by a pipe, $g$, connected, as herein shown, with a two-way valve in the main supply-pipe $a'$.

The plug B' of the two-way valve B is bored transversely, as at 2, while the valve-case is cut away or recessed upon one side, as at 3, so that the steam may pass either through the pipe $a'$ or the pipe $g$, according to the position of the plug B', an operating-lever, $h$, being employed to turn the said plug.

A suitable cord, $n$, is connected with the operating-lever $h$, passing over suitable sheaves or pulleys (not shown) to any part of the building; and when it is desired to stop the main engine, as in case of accident or for other causes, the person may pull the cord $n$, turning the plug B' by the operating-lever, cutting off the steam from the main engine and directing it into the steam-cylinder $f^2$ of the auxiliary engine, forcing the piston $f$ of the said auxiliary engine backward and causing the brake-shoe to come in contact with the pulley $c$.

If high pressure of steam is being employed and its course is changed to enter the steam-cylinder of the auxiliary engine, the safety-valve $f^3$ is employed to prevent the steam forcing outward the head of the cylinder.

A spiral spring, $m$, encircling the piston-rod $f'$, is employed to normally retain the piston at the forward end of the cylinder.

The pressure of the brake-cylinder may obviously be relieved, when desired, by the valve or cock $f^4$.

We are aware that engines have heretofore been provided with steam-actuated brakes to stop them when the steam-supply was cut off, the valves by which the steam was admitted to the cylinders containing the brake-pistons being connected with the levers operating the throttle-valves of the engines, so that the brakes would be applied when the steam was shut off from the main cylinders, and we do not, therefore, wish to be understood as claiming steam-actuated brakes for steam-engines, broadly.

We are also aware that the cylinders of gas-engines have been provided with safety-valves.

We are also aware of the patents to Otis, No. 131,896, and to Parker, No. 313,365, and we do not wish to be understood as claiming the constructions therein shown.

We claim—

1. The combination, with a steam-engine, of a wheel or pulley carried by the main shaft thereof, a brake adapted to be applied to the said wheel or pulley, an auxiliary engine for operating said brake, a pipe for conveying steam to the cylinder of the main engine, a branch pipe therefrom for supplying steam to the auxiliary engine, and a valve located at the junction of the said pipes and adapted to cut off the steam from the main engine when operated to turn the steam on to the auxiliary engine, and vice versa, substantially as set forth.

2. The combination, with a steam-engine, of a wheel carried by the main shaft thereof, a brake adapted to be applied to the said wheel, an auxiliary engine for operating said brake, a pipe for conveying steam to the cylinder of the main engine, a branch pipe therefrom for supplying steam to the auxiliary engine, a valve located at the junction of the said pipes and adapted to cut off the steam from the main engine when operated to turn the steam on to the auxiliary engine to apply the said brake, and vice versa, and connections for operating the said valve from a distance, substantially as set forth.

In testimony whereof we have signed our names to this specification in the presence of two subscribing witnesses.

FREDERIC G. BISBEE.
JOHN R. BISBEE.

Witnesses:
THOMAS E. GROVER,
DAVID STANHOPE.